US012810183B2

(12) United States Patent
Kim et al.

(10) Patent No.: US 12,810,183 B2
(45) Date of Patent: Nov. 24, 2026

(54) DEVICE AND METHOD FOR INCREMENTAL MACHINE LEARNING WITH VARYING FEATURE SPACES

(71) Applicant: ELECTRONICS AND TELECOMMUNICATIONS RESEARCH INSTITUTE, Daejeon (KR)

(72) Inventors: Cheol Ho Kim, Daejeon (KR); Jung Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 993 days.

(21) Appl. No.: 17/938,014

(22) Filed: Oct. 4, 2022

(65) Prior Publication Data

US 2023/0214697 A1 Jul. 6, 2023

(30) Foreign Application Priority Data

Jan. 5, 2022 (KR) ........................ 10-2022-0001722

(51) Int. Cl.
*G06N 20/00* (2019.01)
*G06N 7/01* (2023.01)

(52) U.S. Cl.
CPC ............... *G06N 7/01* (2023.01); *G06N 20/00* (2019.01)

(58) Field of Classification Search
CPC ........... G06N 7/01; G06N 20/00; G06N 20/10
See application file for complete search history.

(56) References Cited

U.S. PATENT DOCUMENTS 11,144,833 B2 10/2021 Kwon
2021/0209514 A1 7/2021 Kim
2024/0169218 A1 * 5/2024 Lee .................... G06Q 30/0203

FOREIGN PATENT DOCUMENTS

JP 2011-18246 A 1/2011
JP 2021-135812 A 9/2021
KR 10-2012-0072951 A 7/2012
(Continued)

OTHER PUBLICATIONS

A Correlation-Based Feature Weighting Filter for Naive Bayes (Year: 2019).*
(Continued)

*Primary Examiner* — Mohamed Abou El Seoud

(57) ABSTRACT

The present invention relates to a device and method for incremental machine learning in a varying feature space. A device for machine learning according to the present invention includes a probability table generator configured to generate a probability table for a target feature of a dataset and a conditional probability table for each input feature of the dataset, based on the received dataset, a correlation extractor configured to extract relevance between the target feature and each of the input features and redundancy between the input features, based on the dataset, and a feature weight extraction and model generator configured to extract weights for each of the input features based on the relevance and the redundancy, and generate a prediction model based on the probability table for the target feature, the conditional probability table, and the weight.

15 Claims, 6 Drawing Sheets

(56) References Cited

FOREIGN PATENT DOCUMENTS

| | | | |
|---|---|---|---|
| KR | 10-2021-0007735 | A | 1/2021 |
| KR | 10-2021-0088421 | A | 7/2021 |

OTHER PUBLICATIONS

A Regularized Attribute Weighting Framework for Naive Bayes (Year: 2020).*

Feature Selection Based on Mutual Information: Criteria of Max-Dependency, Max-Relevance, and Min-Redundancy (Year: 2005).*

Steven C.H. Hoi et al., "Online Learning: A comprehensive survey," Elsevier, Neurocomputing, Apr. 30, 2021.

Yi He et al., "Toward Mining Capricious Data Streams: A Generative Approach," IEEE Transactions on Neural Networks and Learning Systems, Mar. 2021, vol. 32, No. 3.

Liangxiao Jiang et al., "A Correlation-Based Feature Weighting Filter for Naive Bayes," IEEE Transactions on Knowledge and Data Engineering, Feb. 2019, vol. 31, No. 2.

* cited by examiner

DEVICE AND METHOD FOR INCREMENTAL MACHINE LEARNING WITH VARYING FEATURE SPACES

CROSS-REFERENCE TO RELATED APPLICATION

This application claims priority to and the benefit of Korean Patent Application No. 10-2022-0001722, filed on Jan. 5, 2022, the disclosure of which is incorporated herein by reference in its entirety.

BACKGROUND

1. Field of the Invention

The present invention relates to a device and method for incremental machine learning with varying feature spaces. The present invention corresponds to supervised learning among machine learning, and is mainly designed to deal with classification problems, but can also be applied to regression problems.

2. Discussion of Related Art

A term having a similar meaning to "incremental machine learning" dealt with in the present invention is "online learning." However, unlike incremental machine learning, since most online learning is performed with the same feature space as previously trained data when a new training instance is input, there is no need to consider the problem of model adaptation according to changes in the feature space. Sometimes, missing values occur in some features, which is solved through various methods of filling missing values (missing value imputation method).

In neural-network-based algorithms, which are the most widely used machine learning method, it is hard to solve a catastrophic forgetting phenomenon in which the knowledge constructed by the existing model is lost when new data is input, and thus they have the problem of being vulnerable to continuously varying feature spaces.

Several incremental machine learning methods have been published to deal with the above problem. Among them, a method of incrementally updating a model by constructing a universal feature space based on a linear model is evaluated as the most advanced. The above method proposes an incremental learning algorithm in a data stream in which the feature space varies, and involves constructing a universal feature space composed of all features appearing through the data stream and constructing a classification learning model through linear regression based on the universal feature space while continuously updating the universal feature space. In a given instance at a specific time of stream, there are observed features included in the universal feature space and unobserved features that are not included in the universal feature space, and the method involves continuously updating the universal feature space while reconstructing the unobserved features based on the observed features.

Although the method effectively performs the incremental learning in the varying feature space, there are the following problems (1), (2), and (3).

(1) Since parameters of a linear model may freely change for new instances, the method is effective in predicting current data, but is vulnerable to maintaining knowledge constructed in the past (problem of robustness).

(2) Since the linear model is based on the linear regression, the method is valid only when a target feature to be predicted has a binary class. For multi-class prediction, a separate technique needs to be added.

(3) It takes much computation time to optimize a model since there are many hyperparameters.

SUMMARY OF THE INVENTION

The present invention is directed to providing a device and method for incremental machine learning with robustness to adapt to a continuous change in space and maintain knowledge acquired in the past by updating a machine learning model by a method of forming feature nodes for all features appearing in a dataset, deriving correlations, adding the feature nodes to new features, and then deriving correlations between the existing features and new features.

In addition, the present invention is directed to providing a device and method for incremental machine learning capable of solving a computational complexity problem of the related art and enabling multi-class prediction without an additional operation by obtaining optimized results with minimal hyperparameter adjustment.

An aspect of the present invention is not limited to the above-described aspect. That is, other aspects that are not described may be obviously understood by those skilled in the art from the following specification.

According to an aspect of the present invention, a device for machine learning includes: a probability table generator configured to generate a probability table for a target feature of a dataset and a conditional probability table for each input feature of the dataset, based on the received dataset; a correlation extractor configured to extract relevance between the target feature and each of the input features and redundancy between the input features, based on the dataset; and a feature weight extraction and model generator configured to extract weights for each of the input features based on the relevance and the redundancy, and generate a prediction model based on the probability table for the target feature, the conditional probability table, and the weight.

The correlation extractor may extract the relevance based on mutual information between the target feature and each of the input features.

The correlation extractor may extract the redundancy based on mutual information between the input features.

The feature weight extraction and model generator may generate the prediction model after setting the weight to 1.

The feature weight extraction and model generator may extract the weight according to the following equation.

$$w_i = \sigma(\alpha_i \cdot D(X_i) - \beta_i \cdot R(X_i)) \quad \text{[Equation]}$$

(In the above equation, i denotes an identifier of the input feature, $w_i$ denotes the weight, $D(X_i)$ denotes the relevance of the input feature $X_i$, $\alpha_i$ denotes a coefficient ($\alpha_i \geq 0$) of the relevance, $R(X_i)$ denotes the redundancy of the input feature $X_i$, $\beta_i$ denotes a coefficient ($\beta i \geq 0$) of redundancy, and $\sigma(x)$ denotes a sigmoid function with $1/(1+e^{-x})$.)

The feature weight extraction and model generator may extract the weight after setting $\alpha_i$ to 1 and $\beta_i$ to 1 in the above equation.

The feature weight extraction and model generator may evaluate an accuracy of the prediction model using the dataset, and determine ci and $\beta_i$ of the above equation based on the accuracy.

The probability table generator may update the probability table for the target feature and the conditional probability table based on a new dataset when the new dataset is input after the dataset is input.

The correlation extractor may update the relevance and the redundancy based on a new dataset when the new dataset is input after the dataset is input.

The probability table generator may not update a conditional probability table for the missing variable when there is a missing variable in the new dataset.

The probability table generator may calculate a conditional probability for a new feature to update the conditional probability table when there is an input feature ("new feature") that is not reflected in the conditional probability table in the new dataset.

The correlation extractor may not update relevance and redundancy for a missing variable when the missing variable is in the new dataset.

The correlation extractor may update the relevance and the redundancy for all input features having data in the new dataset, including a new feature when there is an input feature ("new feature") that is not reflected in the relevance and the redundancy in the new dataset.

The feature weight extraction and model generator may input a new dataset after the dataset is input, the probability table generator may update the probability table for the target feature and the conditional probability table based on the new dataset, and when updating the relevance and the redundancy based on the new dataset, the correlation extractor may update a prediction model based on the updated probability table for the target feature, the updated conditional probability table, the updated relevance, and the updated redundancy.

According to another aspect of the present invention, a method of machine learning includes: generating a probability table for a target feature of a dataset and a conditional probability table for each input feature of the dataset, based on the received dataset; extracting relevance between the target feature and each of the input features and redundancy between the input features, based on the dataset; and extracting weights for each of the input features based on the relevance and the redundancy, and generating a prediction model based on the probability table for the target feature, the conditional probability table, and the weight.

The method may further include: updating the probability table for the target feature, the conditional probability table, the relevance and the redundancy based on a new dataset after the dataset is input, and updating the prediction model based on the updated probability table for the target feature, the updated conditional probability table, the updated relevance, and the updated redundancy.

In the generating of the prediction model, the weight may be extracted according to the following equation.

$$w_i=\sigma(\alpha_i \cdot D(X_i)-\beta_i \cdot R(X_i)) \quad \text{[Equation]}$$

(In the above equation, i denotes an identifier of the input feature, $w_i$ denotes the weight, $D(X_i)$ denotes the relevance of the input feature $X_i$, $\alpha_i$ denotes a coefficient ($\alpha_i \geq 0$) of the relevance, $R(X_i)$ denotes the redundancy of the input feature $X_i$, $\beta_i$ denotes a coefficient ($\beta_i \geq 0$) of redundancy, and $\sigma(x)$ denotes a sigmoid function with $1/(1+e^{-x})$.)

In the generating of the prediction model, an accuracy of the prediction model may be evaluated using the dataset, and $\alpha_i$ and $\beta_i$ of the above equation may be determined based on the accuracy.

In the updating of the prediction model, the conditional probability table may be updated by calculating a conditional probability for a new feature when there is an input feature ("new feature") that is not reflected in the conditional probability table in the new dataset.

In the updating of the prediction model, the relevance and the redundancy for all input features having data in the new dataset may be updated, including a new feature when there is an input feature ("new feature") that is not reflected in the relevance and the redundancy in the new dataset.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
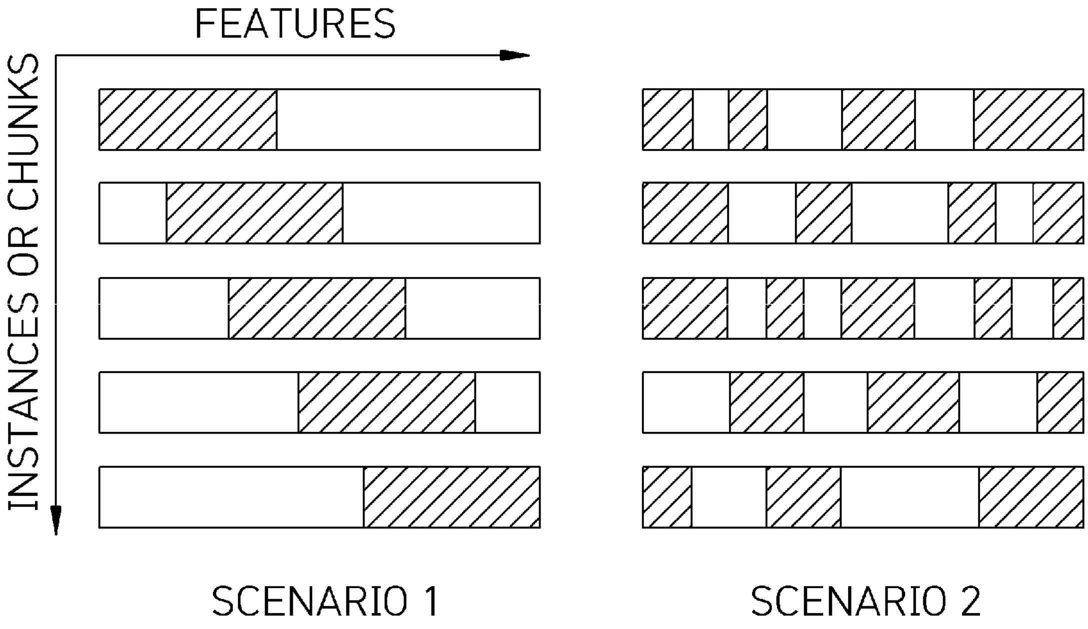
FIG. 1 is a diagram illustrating two scenarios for a variable feature space which are applied for performance comparison between an adaptively weighted incremental naïve Bayes (AWINB) model according to the present invention and an existing generative learning with streaming capricious data (GLSC) model.

The present invention relates to a method of incremental machine learning capable of dealing with varying feature spaces that existing machine learning may not effectively implement. The present invention provides a method of incremental machine learning capable of continuously updating a learning model even under the conditions that previous training data is not given, in a varying feature space in which configurations of features, variables, or attributes constituting data in a data stream input in real time or in a number of datasets given regularly or irregularly are continuously varying. The present invention corresponds to supervised learning among machine learning, and is mainly designed to deal with classification problems, but can also be applied to regression problems.

Examples of the main application fields of the present invention include a medical information-based decision support system using electronic medical records (EMRs) or electronic health records (EHRs), an Internet-of-things (IOT)-based smart factory, financial data analysis, prediction, and the like. The present invention is very useful in situations where fast learning and reasoning are required, or free access to data is difficult due to reasons of personal information, security, and the like.

Various advantages and features of the present invention and methods of accomplishing them will become apparent from the following description of embodiments with reference to the accompanying drawings. However, the present invention is not limited to exemplary embodiments to be described below, but may be implemented in various different forms, these embodiments will be provided only in order to make the present invention complete and allow those skilled in the art to completely recognize the scope of the present invention, and the present invention will be defined by the scope of the claims. Meanwhile, terms used in the present specification are for explaining exemplary embodiments rather than limiting the present invention. Unless otherwise stated, a singular form includes a plural form in the present specification. "Comprise" and/or "comprising" used in the present invention indicate(s) the presence of stated components, steps, operations, and/or elements but do(es) not exclude the presence or addition of one or more other components, steps, operations, and/or elements.

When it is decided that the detailed description of the known art related to the present invention may unnecessarily obscure the gist of the present invention, such detailed description will be omitted.

Hereinafter, embodiments of the present disclosure will be described in detail with reference to the accompanying drawings. The same means will be denoted by the same reference numerals throughout the accompanying drawings in order to facilitate the general understanding of the present invention in describing the present invention.

Figure 3:
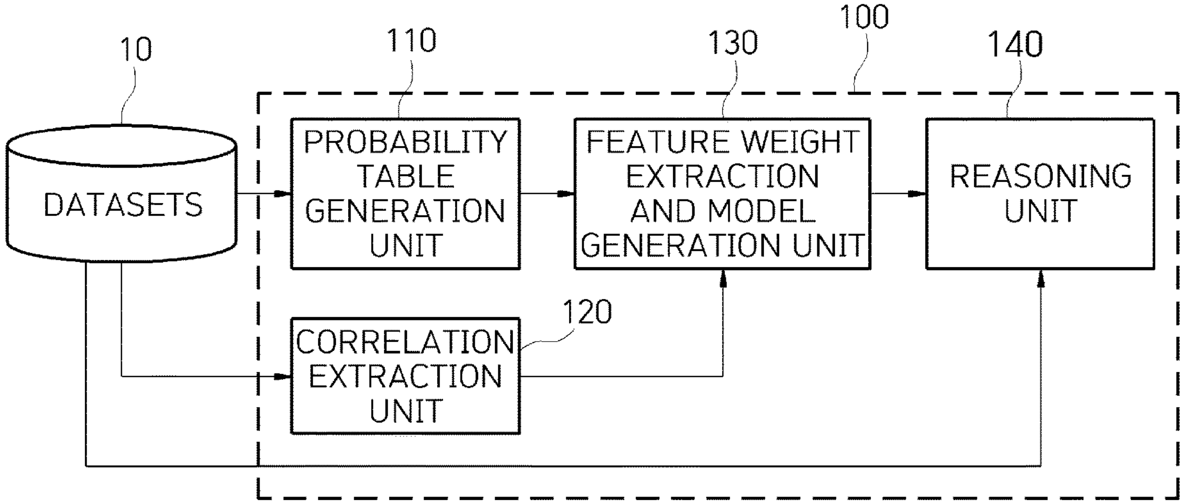
FIG. 3 is a block diagram illustrating a configuration of a device for incremental machine learning according to an embodiment of the present invention.

FIG. 3 is a block diagram illustrating a configuration of a device for incremental machine learning according to an embodiment of the present invention.

A device 100 for incremental machine learning according to the embodiment of the present invention may generate a prediction model through machine learning based on a received dataset 10, and may perform reasoning using the prediction model. The device 100 for incremental machine learning may incrementally update a model without a previous dataset when each dataset of multiple data or a data stream composed of a plurality of datasets is sequentially input.

As illustrated in FIG. 3, the device 100 for incremental machine learning according to the embodiment of the present invention includes a probability table generator 110, a correlation extractor 120, and a feature weight extraction and model generator 130, and may further include a reasoner 140.

The probability table generator 110 may generate a probability table for a target feature of the dataset 10 and a conditional probability table for each input feature conditioned on the target feature of the dataset 10 based on the received dataset 10, or generate a conditional probability table for each input feature conditioned on a target feature or one or more input features. In addition, the probability table generator 110 may generate an incremental classifier (e.g., naïve Bayes) based on a probability table for a target feature and a conditional probability table for each input feature. In addition, the probability table generator 110 may construct a Bayesian network based on a target feature or a conditional probability table for each input feature conditioned on one or more input features.

The dataset 10 may be composed of one instance or a plurality of instances.

The correlation extractor 120 extracts relevance between the target feature and each input feature and redundancy between the input features based on the dataset 10.

The feature weight extraction and model generator 130 extracts (calculates) weights for each input feature based on the relevance and redundancy extracted by the correlation extractor 120, and generates a prediction model based on the probability table for the target feature and the conditional probability table that are generated by the probability table generator 110 and the weights for each input feature and transmits the generated prediction model to the reasoner 140.

The reasoner 140 receives the dataset 10 and performs reasoning using the prediction model. In this case, the dataset 10 corresponds to the test data, not the training data.

Figure 4:
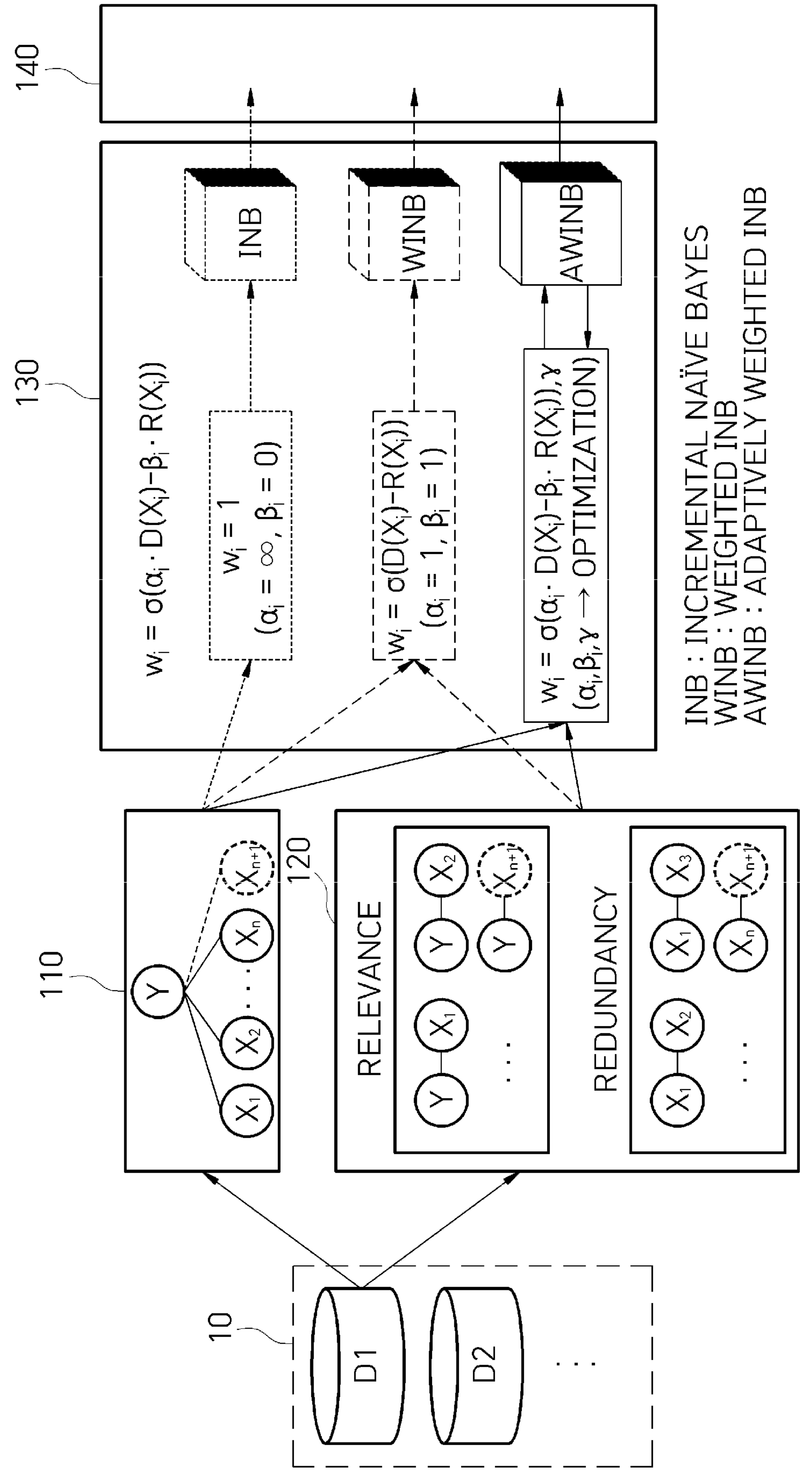
FIG. 4 is a reference diagram illustrating a prediction model construction process of the device for incremental machine learning according to the embodiment of the present invention.

FIG. 4 is a reference diagram illustrating a prediction model construction process of the device for incremental machine learning according to the embodiment of the present invention.

As illustrated in FIG. 4, the device 100 for incremental machine learning according to the embodiment of the present invention may incrementally update a model without the previous dataset when multiple data composed of multiple datasets or each dataset of a data stream is sequentially input. As illustrated in FIGS. 3 and 4, the present invention includes a probability table generator 110, a correlation extractor 120, and a feature weight extraction and model generator 130, and derives a new prediction model for each input operation through these components. For example, whenever D1 and D2 of FIG. 4 are input, a new prediction model is derived. As described above, each dataset may be composed of one or a plurality of instances. When each dataset is composed of one instance, the prediction model is updated every time the instance is input.

Each component of the device 100 for incremental machine learning will be described in detail below.

The probability table generator 110 generates the probability table for the target feature of the dataset 10 and the conditional probability table for each input feature of the dataset 10, based on the received dataset 10.

In addition, the probability table generator 110 may generate a regressor based on the dataset 10, and generate the incremental classifier based on the probability table for the target feature and the conditional probability table for each input feature (which may simply be called a "feature" below).

The incremental classifier may be updated through learning based on only the current dataset without the previous dataset in the situation where the datasets are sequentially received. For example, it is assumed that the probability table generator 110 generates an incremental classifier model 1 M1 using dataset1 D1. Thereafter, when dataset 2 D2 is given as training data, the probability table generator 110 may update the classifier based on only the dataset 2 D2 and the model 1 M1 when access to dataset 1 D1 is not possible to obtain a model 2 M2.

The probability table generator 110 may use a machine learning algorithm capable of the sequential learning method in order to generate the incremental classifier. The most easily applicable algorithm is the naïve Bayes-based classifier learning algorithm (hereinafter, "naïve Bayes algorithm"). The naïve Bayes algorithm is a machine learning algorithm having the simplest structure among Bayesian networks, and makes it easy to handle missing values or add new features under the assumption of conditional independence between features.

The probability table generator 110 defines a class feature (corresponding to a target feature, hereinafter "class") and features each as nodes. The probability table generator 110 trains a model (e.g., a naïve Bayes-based incremental classifier) in order to generate a probability table for a class (target feature) and a conditional probability table (CPT) of each feature node based on the training data 10.

When a new dataset is input, the probability table generator 110 updates a prediction model (e.g., a naïve Bayes-based incremental classifier) constructed using the existing dataset. That is, the probability table generator 110 updates the existing probability table for the target feature and the conditional probability table (CPT) for each input feature according to the input of the new dataset. The probability table generator 110 may deal with a missing value by simply not updating the CPT of the corresponding feature when there is a missing variable in a new dataset (training data), adds a new feature node to the previously constructed prediction model (e.g., a naïve Bayes-based incremental classifier) when a new feature appears, and updates the CPT of the node.

This will be described below with reference to the probability table generator 110 illustrated in FIG. 4. n feature nodes $X_1, \ldots,$ and $X_n$ appearing in the learning process are connected to class node Y. If a value that Y may take is y, then $y \in Val(Y)=\{1, 2, \ldots, c\}$. If a value of the feature node $X_i$ is $x_i$, and $x_i$ may have as many values as $|X_i|$, then $xi \in \{x_{i,1}, x_{i,2}, \ldots, x_{i,|xi|}\}$. In this case, the naïve Bayes model may be represented as [Equation 1].

[Equation 1]

$$\underset{y\in Val(Y)}{\operatorname{argmax}}(P(y \mid x_1, \ldots x_n)) = \underset{y\in Val(Y)}{\operatorname{argmax}}(P(y)P(x_1, \ldots, x_n \mid y)) = \underset{y\in Val(Y)}{\operatorname{argmax}}\left(P(y)\prod_{i=1}^{n}P(x_i \mid y)\right) = \underset{y\in Val(Y)}{\operatorname{argmax}}\left(\log P(y) + \sum_{i=1}^{n}\log P(x_i \mid y)\right)$$

The probability table generator 110 does not update the CPT corresponding to $X_k$ in the learning process if any feature $X_k$ ($1 \leq k \leq n$) is missing when the training instance is additionally input. That is, in the case of the missing variable, the probability table generator 110 does not update the conditional probability table for the corresponding feature.

Meanwhile, when a new feature $X_{n+1}$ appears in a new instance, a model is updated by adding a feature node $X_{n+1}$ connected to a class node to the existing model. The probability table generator 110 updates the model only depending on the current model and the new training data for the missing variable and the new feature through this process.

The probability table generator 110 transmits, to the feature weight extraction and model generator 130, the trained or updated ① probability table for the target feature of the dataset 10 and ② the conditional probability table for each input feature of the dataset 10. The probability table generator 110 transmits the generated or updated naïve Bayes-based incremental classifier model to the feature weight extraction and model generator 130. The feature weight extraction and model generator 130 may generate various classifier models based on the probability tables of ① and ② and the weights for each input feature. That is, the feature weight extraction and model generator 130 may generate various classifier models based on the naïve Bayes-based incremental classifier model generated or updated by the probability table generator 110 and the weights for each input feature.

The correlation extractor 120 extracts relevance between the target feature and each input feature and redundancy between the input features based on the dataset 10.

The correlation extractor 120 extracts the relevance and the redundancy based on a joint probability between the class node and the feature node and between the feature nodes.

Here, the relevance quantifies the correlation between the class node and the specific feature node and normalizes the entire feature, and indicates the relative correlation between the class node and the corresponding feature node. The redundancy quantifies a correlation between a specific feature and the rest of the features and normalizes the entire feature, and indicates how much distribution characteristics of the corresponding feature overlap with other features.

The correlation extractor 120 may use various statistical calculation methods such as a Pearson correlation coefficient, a Spearman correlation coefficient, and mutual information to quantify the correlation.

Among the correlation quantification methods, the mutual information-based extraction method is useful because it may consider not only a linear relationship between features but also a non-linear relationship between features. An example of a method in which the correlation extractor 120 calculates the relevance $D(X_i)$ using the mutual information $(I(X_i;Y))$ is as shown in [Equation 2] and [Equation 3].

$$D(X_i) = \frac{I(X_i; Y)}{\frac{1}{n}\sum_{X_i} I(X_i; Y)} \quad \text{[Equation 2]}$$

$$I(X_i; Y) = \sum_{x_{i,k}\in Val(X_i)} \sum_{y_l\in Val(Y)} P(x_{i,k}, y_l)\log\left(\frac{P(x_{i,k}, y_l)}{P(x_{i,k})P(y_l)}\right) \quad \text{[Equation 3]}$$

An example of a method in which the correlation extractor 120 calculates the redundancy $R(X_i)$ using the mutual information $(I(X_i;X_j))$ is as shown in [Equation 4] and [Equation 5].

$$R(X_i) = \frac{1}{n-1}\sum_{X_j\wedge(X_j\neq X_i)} \frac{I(X_i; X_j)}{\frac{1}{n(n-1)}\sum_{X_i}\sum_{X_j\wedge(X_j\neq X_i)} I(X_i; X_j)} \quad \text{[Equation 4]}$$

$$I(X_i; X_j) = \sum_{x_{i,k}\in Val(X_i)} \sum_{x_{j,l}\in Val(X_j)} p(x_{i,k}, x_{j,l})\log\left(\frac{p(x_{i,k}, x_{j,l})}{p(x_{i,k})p(_{j,l})}\right) \quad \text{[Equation 5]}$$

When a new dataset (training data) is input, the correlation extractor 120 updates the extracted correlation (relevance and redundancy) based on the existing dataset. In this case, the correlation extractor 120 does not update relevance and redundancy for missing variables, and calculates relevance and redundancy for each connection between a new feature and an existing feature for a new feature and adds the calculated relevance and redundancy to the previously calculated correlation. That is, the correlation extractor 120 updates relevance and redundancy for not only a new feature of a new dataset but also the existing feature having a data value in a new dataset. Specifically, when an input feature (new feature) that is not reflected in the relevance and redundancy exists in the new dataset, the correlation extractor 120 updates relevance and redundancy for all input features having data in the new dataset, including the new feature.

The feature weight extraction and model generator 130 extracts (calculates) weights for each input feature based on the relevance and redundancy extracted by the correlation extractor 120, and generates a prediction model based on the probability table for the target feature and the conditional probability table that are generated by the probability table generator 110 and the weights for each input feature and transmits the generated prediction model to the reasoner 140.

The feature weight extraction and model generator 130 generates a classifier model based on a probability table for a target feature, a conditional probability table for each input feature, and a weight for each input feature. In other words, the feature weight extraction and model generator 130 may generate a classifier model based on the naïve Bayes-based incremental classifier model generated or updated by the weight and probability table generator 110 for each input feature.

Since the above-described naïve Bayes-based incremental classifier model usually has a simple structure, the naïve Bayes-based incremental classifier model may not have good prediction performance due to lack of representation capability of a model constructed with training data. For example, the above-described naïve Bayes-based incremental classifier model assumes that features are mutually independent under the condition of class features, but most data used for practical applications has characteristics that do not meet this assumption. As a method of overcoming these limitations and improving the representation capability of the model, there is a weight assignment method of assigning weights to each feature. The feature weight extraction and model generator 130 is a component that calculates a weight required to assign an appropriate feature to each feature. The feature weight extraction and model generator 130 may target an incremental classifier other than the above-described naïve Bayes. However, for convenience of description, description of the function of the feature weight extraction and model generator 130 will be limited to the naïve Bayes-based incremental classifier.

When the feature weight $w_i$ is applied to [Equation 1], the feature weight $w_i$ may be represented as in [Equation 6]. The feature weight extraction and model generator 130 may obtain [Equation 6] by applying the feature weights $w_i$ based on the probability table for the target feature received from the probability table generator 110 and the conditional probability table for each input feature.

$$\underset{y\in Val(Y)}{\operatorname{argmax}}(\log P(y \mid x_1, \ldots x_n)) = \underset{y\in Val(Y)}{\operatorname{argmax}}\left(\log P(y) + \gamma\sum_{i=1}^{n} w_i \log P(x_i \mid y)\right) \quad \text{[Equation 6]}$$

In [Equation 6], $\gamma$ is a coefficient introduced to balance between log P(y) and $$\sum_{i=1}^{n} \log P(x_i \mid y),$$

and is set to 1 when the two terms are treated equally.

As an example of the method for a feature weight extraction and model generator 130 to calculate a feature weight $w_i$, it is possible to calculate the feature weight $w_i$ based on relevance and redundancy as in [Equation 7].

$$w_i = \sigma(\alpha_i \cdot D(X_i) - \beta_i \cdot R(X_i)) \quad \text{[Equation 7]}$$

In [Equation 7], $\alpha_i$ and $\beta_i$ are coefficients and may be non-negative real numbers, and $\sigma(x)$ is a sigmoid function and is defined as $1/(1+e^{-x})$. The feature weight $w_i$ is determined according to the values of $\alpha_i$ and $\beta_i$, and the classifier model generated by the feature weight extraction and model generator 130 may be largely divided into three forms such as (1) incremental naïve Bayes (INB), (2) weighted incremental naïve Bayes (WINB), and (3) adaptively weighted incremental naïve Bayes (AWINB) according to $w_i$.

(1) The INB is a model generated when the feature weight extraction and model generator 130 sets coefficients for i=1, . . . ,n to $\alpha_i=\infty$ and $\beta_i=0$. In this case, all features have a weight of $w_i=1$, and thus are practically the same model as the naïve Bayes-based incremental classifier model.

(2) The WINB is a model generated when the feature weight extraction and model generator 130 sets coefficients to $\alpha_i=\beta_i=1$. In this case, the feature weight calculation equation becomes $w_i=\sigma(D(X_i)-R(X_i))$. In this case, the feature weight extraction and model generator 130 derives the feature weight with only the relevance and redundancy regardless of the coefficient value.

(3) The AWINB is a model generated when the feature weight extraction and model generator 130 extracts feature weights without placing limitations such as (1) or (2) on $\alpha_i$ and $\beta_i$. The purpose of constructing the AWINB model is to improve the effectiveness of feature weights and the adaptability of the model. The feature weight extraction and model generator 130 may apply various methods to derive di and $\beta_i$. One effective method is to determine each coefficient using the accuracy that is the result of supervised learning using the training data (dataset 10). The feature weight extraction and model generator 130 may optimize not only $\alpha_i$ and $\beta_i$, but also $\gamma$ of [Equation 6] for a sophisticated result.

As described above, it can be seen that the INB and WINB may be included as a special case of the AWINB. There is a difference in that the feature weight extraction and model generator 130 does not reflect the results of training data in determining the feature weights of the INB and the WINB, but reflects the learning results in determining coefficients (e.g., feature weight, Y, etc.) of the AWINB.

When a new dataset is input to the device 100 for incremental machine learning, the feature weight extraction and model generator 130 receives the updated probability table (probability table for the target feature and conditional probability table for each input feature) from the probability table generator 110, and receives the updated correlation (relevance and redundancy) between the features from the correlation extractor 120. The feature weight extraction and model generator 130 updates the weights for each input feature based on the updated relevance and redundancy, and updates the prediction model based on the updated weights and the updated probability table ($\alpha$probability table for a target feature and a conditional probability table for each input feature).

The reasoner 140 receives the dataset 10 and performs inference using the prediction model. In this case, the dataset 10 corresponds to the test data, not the training data. The reasoning performed by the reasoner 140 is the same as the reasoning of general machine learning. However, when there is a missing variable in the instance of the test data to be reasoned, the reasoner 140 ignores a node corresponding to the corresponding feature in the incremental classifier, and thus all of relevance, redundancy, and feature weights related to the feature are ignored.

Figure 5:
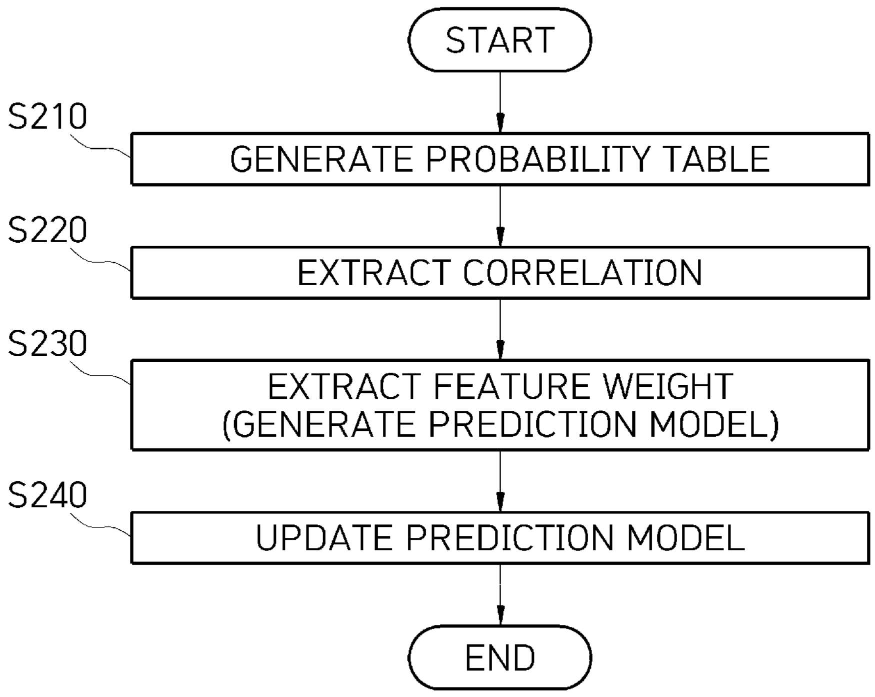
FIG. 5 is a flowchart illustrating a method of incremental machine learning according to an embodiment of the present invention.

FIG. 5 is a flowchart illustrating a method of incremental machine learning according to an embodiment of the present invention. The method of incremental machine learning according to an embodiment of the present invention includes operations S210 to S240. Hereinafter, an embodiment of constructing a naïve Bayes-based incremental classifier model and generating a prediction model by applying feature weights to each feature of the incremental classifier will be described with reference to FIGS. 4 and 5.

Operation S210 is a probability table generation operation. This operation is an operation of generating a probability table for the target feature of the dataset and a conditional probability table for each input feature of the dataset based on the dataset. The method of incremental machine learning according to the embodiment of the present invention is performed based on a plurality of training datasets or data streams. First, the probability table generator 110 constructs a naïve Bayes-based incremental classifier model based on a dataset D1. The probability table generator 110 designates a node (class node) corresponding to a class feature, forms feature nodes for all input features (hereinafter "feature") appearing in D1, and connects the feature nodes to the class node. The probability table generator 110 generates a probability table P(y) for a target feature (class feature) and a conditional probability table (CPT, $P(X_1, \ldots, x_n|y)$) for feature nodes based on the dataset D1. Details have been described above in the description of the probability table generator 110.

Operation S220 is a correlation extraction operation. This operation is an operation of extracting the relevance between the target feature and each input feature and the redundancy between the input features based on the dataset. The correlation extractor 120 extracts a correlation (relevance and redundancy) based on the dataset D1. That is, the correlation extractor 120 extracts the relevance between the target feature and each input feature and redundancy between the input features based on the dataset 10. The correlation extractor 120 calculates a joint distribution of the class feature y and each feature $x_i$ (i=1, . . . ,n) to derive the relevance, and calculates a joint distribution of two features $x_i$ (i=1, . . . ,n) and $x_j$ (j=1, . . . ,n) to derive the redundancy. Details have been described above in the description of the correlation extractor 120.

Operation S230 is a feature weight extraction (prediction model generation) operation. This operation is an operation of extracting weights for each input feature based on the relevance and redundancy extracted in operation S220, and generating a prediction model based on the probability table for the target feature, the conditional probability table, and the weights for each input feature. The feature weight extraction and model generator 130 extracts (calculates) weights for each input feature based on the relevance and redundancy extracted by the correlation extractor 120, and generates a prediction model based on the probability table for the target feature and the conditional probability table that are generated by the probability table generator 110 and the weights for each input feature. The feature weight extraction and model generator 130 derives a weight $w_i$ for each input feature of the prediction model according to at least one of three types of weight calculation methods (Table 1) through a weight extraction equation (Equation 7) based on the correlation (relevance and redundancy) generated by the correlation extractor 120 However, the feature weight extraction and model generator 130 optimizes weights by not only extracting the feature weights but also feeding back the training results of the training data when the weights are extracted by the method of (3) of [Table 1].

TABLE 1

| | (1) | (2) | (3) |
|---|---|---|---|
| $\alpha_i$ | $\infty$ | 1 | Real number of $\alpha_i \geq 0$ |
| $\beta_i$ | 0 | 1 | Real number of $\beta_i \geq 0$ |
| $w_i$ | 1 | $\sigma(D(X_i) - R(X_i))$ | $\sigma(\alpha_i \cdot D(Xi) - \beta_i \cdot R(X_i))$ |

The feature weight extraction and model generator 130 may derive models of the INB, the WINB, and the AWINB by applying the feature weights extracted as described above to each feature of the incremental classifier. Details have been described above in the description of the feature weight extraction and model generator 130.

Operation S240 is a prediction model update operation. This operation is an operation of updating a prediction model based on a new dataset when the new dataset is input after the existing dataset is input. That is, in this operation, the device 100 for incremental machine learning updates the probability table for the target feature, the conditional probability table for each input feature, the relevance between the target feature and each input feature, and the redundancy between the input features based on the new dataset. The device 100 for incremental machine learning updates the weights for each input feature based on the updated relevance and redundancy, and updates the prediction model based on the updated target feature probability table, the updated conditional probability table, and the updated weights. The device 100 for incremental machine learning updates the correlation (relevance and redundancy) and the feature weight extracted based on D1 and an incremental classifier constructed using D1 when a new dataset D2 is input. In the case of updating the already constructed incremental classifier using D2, there may be a plurality of missing variables ($X_k$, etc.) and new features ($X_{n+1}$, etc.). In the case of the missing variable, the probability table generator 110 does not update the corresponding feature as described above, but adds a new feature node to the previously constructed incremental classifier for a new feature. This also applies to the correlation extractor 120. The correlation extractor 120 does not update the relevance and redundancy for the missing variables, and calculates the relevance and redundancy for each connection between the new feature and the existing feature for the new feature and adds the calculated relevance and redundancy to the previously calculated correlation. The subsequent learning processes are the same as the case of performing learning based on D1.

After operation S230 or after operation S240, the reasoner 140 may receive the dataset 10 and perform reasoning using the prediction model generated through operation S230 or the prediction model updated through operation S240. In this case, the dataset 10 corresponds to the test data, not the training data. The reasoning performed by the reasoner 140 is the same as the reasoning of general machine learning. However, when there is a missing variable in the instance of the test data to be reasoned, the reasoner 140 ignores the node corresponding to the corresponding feature in the incremental classifier, and thus all of the relevance, redundancy, and feature weights related to the feature are ignored.

Meanwhile, in the description with reference to FIG. 5, each operation may be further divided into additional operations or combined into fewer operations according to an implementation example of the present invention. Also, some operations may be omitted if necessary, and an order between the operations may be changed. In addition, the content of FIGS. 3 and 4 may be applied to the content of FIG. 5 even if other content is omitted. Also, the content of FIG. 5 may be applied to the content of FIGS. 3 and 4.

Figure 6:
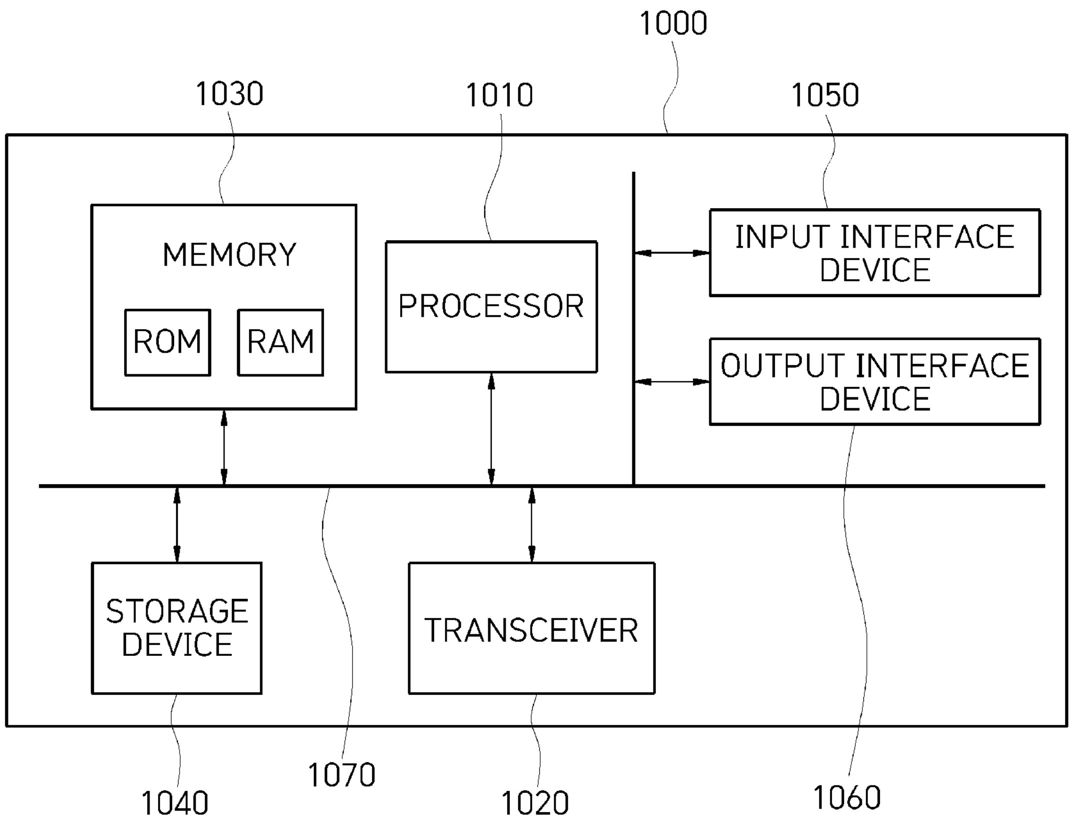
FIG. 6 is a block diagram illustrating a computer system for implementing the method according to the embodiment of the present invention.

FIG. 6 is a block diagram illustrating a computer system for implementing the method according to the embodiment of the present invention.

Referring to FIG. 6, a computer system 1000 may include at least one of a processor 1010, a memory 1030, an input interface device 1050, an output interface device 1060, and a storage device 1040 which communicate via a bus 1070. The computer system 1000 may further include a tranceiver 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random-access memory (RAM). In the embodiment of the present invention, the memory may be positioned inside or outside the processor, and the memory may be connected to the processor through various known units. The memory may include various types of volatile or non-volatile storage media. For example, the memory may include a ROM or a RAM.

Therefore, the embodiment of the present invention may be implemented as a method implemented in a computer or as a non-transitory computer-readable medium having computer-executable instructions stored therein. In an embodiment, when the computer-executable instructions are executed by the processor, the computer-executable instructions may perform the method according to at least one aspect of the present invention.

The tranceiver 1020 may transmit or receive a wired signal or a wireless signal.

Further, the method according to the embodiment of the present invention may be implemented in the form of program instructions that can be executed through various computer units and recorded on computer readable media.

The computer readable media may include program instructions, data files, data structures, or combinations thereof. The program instructions recorded on the computer readable media may be specially designed and prepared for the embodiments of the invention or may be available well-known instructions for those skilled in the field of computer software. The computer readable media may include a hardware device configured to store and execute program instructions. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and perform the program instructions. Examples of the program instruction include machine code generated by a compiler and high-level language code that can be executed in a computer using an interpreter and the like.

For reference, the components according to the embodiment of the present invention may be implemented in the form of software or hardware such as a field programmable gate array (FPGA) or application specific integrated circuit (ASIC), and perform predetermined roles.

However, "components" are not limited to software or hardware, and each component may be configured to be in an addressable storage medium or to reproduce one or more processors.

Accordingly, for example, the components include components such as software components, object-oriented software components, class components, and task components, processors, functions, attributes, procedures, subroutines, segments of a program code, drivers, firmware, a microcode, a circuit, data, a database, data structures, tables, arrays, and variables.

Components and functions provided within the components may be combined into a smaller number of components or further divided into additional components.

In this case, it will be appreciated that each block of a processing flowchart and combinations of the flowcharts may be executed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in a block(s) of the flow chart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including instruction means performing the functions described in the block(s) of the flowchart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide steps for performing the functions described in a block(s) of the flowchart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are illustrated in succession may in fact be simultaneously performed or performed in a reverse sequence depending on corresponding functions.

In this case, the term "unit" used in the present embodiment refers to a software or hardware component such as an FPGA or ASIC, and a "unit" performs a certain role. However, "unit" is not meant to be limited to software or hardware. A "unit" may be configured to be stored in a storage medium that can be addressed or may be configured to regenerate one or more processors. Accordingly, as an example, "unit" refers to components such as software components, object-oriented software components, class components, and task components, processes, functions, attributes, procedures, subroutines, segments of program code, drivers, firmware, microcode, circuits, data, databases, data structures, tables, arrays and variables. Components and functions provided within a "unit" may be combined into a smaller number of components and "units" or may be further separated into additional components and "units." In addition, components and "units" may be implemented to perform one or more CPUs in a device or a secure multimedia card.

The above-described method of incremental machine learning has been described with reference to the flowchart illustrated in the drawings. For simplicity, the method has been illustrated and described as a series of blocks, but the invention is not limited to the order of the blocks, and some blocks may occur with other blocks in a different order from that illustrated and described in the present specification or at the same time. Also, various other branches, flow paths, and orders of blocks that achieve the same or similar result may be implemented. In addition, all the illustrated blocks are not necessarily required for implementation of the methods described in the present specification.

According to the present invention, it is possible to preserve knowledge constructed in the past well, implement robustness to change, and adapt to a new environment well compared to the existing device and method for machine learning to which a linear model-based algorithm to deal with continuously varying feature spaces is applied.

In addition, according to the present invention, it is possible to solve a catastrophic forgetting phenomenon of a neural-network-based machine learning algorithm.

In addition, according to the present invention, it is possible to solve a computational complexity problem of the related art, and multi-class prediction without an additional operation by obtaining optimized results through minimal hyperparameter adjustment.

The comparative experimental results between an AWINB model according to the present invention and GLSC as the existing algorithm in terms of preservation of past knowledge and robustness will be described below. Two datasets are used for the above comparison experiment, ① Robot-24 in the machine learning (ML) data repository of University of California (UC) Irvine (http://archive.ics.uci.edu/ml/index.php) and ② Texture. Data properties of the two datasets are as shown in [Table 2] below.

TABLE 2

| Dataset name | Features | Instances | Classes |
|---|---|---|---|
| Robot-24 | 24 | 5456 | 4 |
| Texture | 40 | 5550 | 11 |

First, the instances of each dataset are divided into training data of 75% and test data of 25%. Since the training data is a form in which data for all features is provided, some of the data is artificially removed to allow the feature space to vary. As a result, as illustrated in FIG. 1, scenario 1 in which the feature space varies regularly at regular intervals over 5 operations and scenario 2 in which the feature space varies randomly over 50 operations are obtained. In FIG. 1, a portion from which the existing data is removed is indicated by gray shading. The two scenarios were applied to each of these two datasets, and learning and testing were performed with the two algorithms (models), that is, AWINB and GLSC. In the learning process, each instance was input one by one, and when a new instance was input, the previously input instance was not accessed again. In every learning operation, prediction accuracy of class labels with the same test data was derived, and the results are illustrated in FIG. 2.

Figure 2:
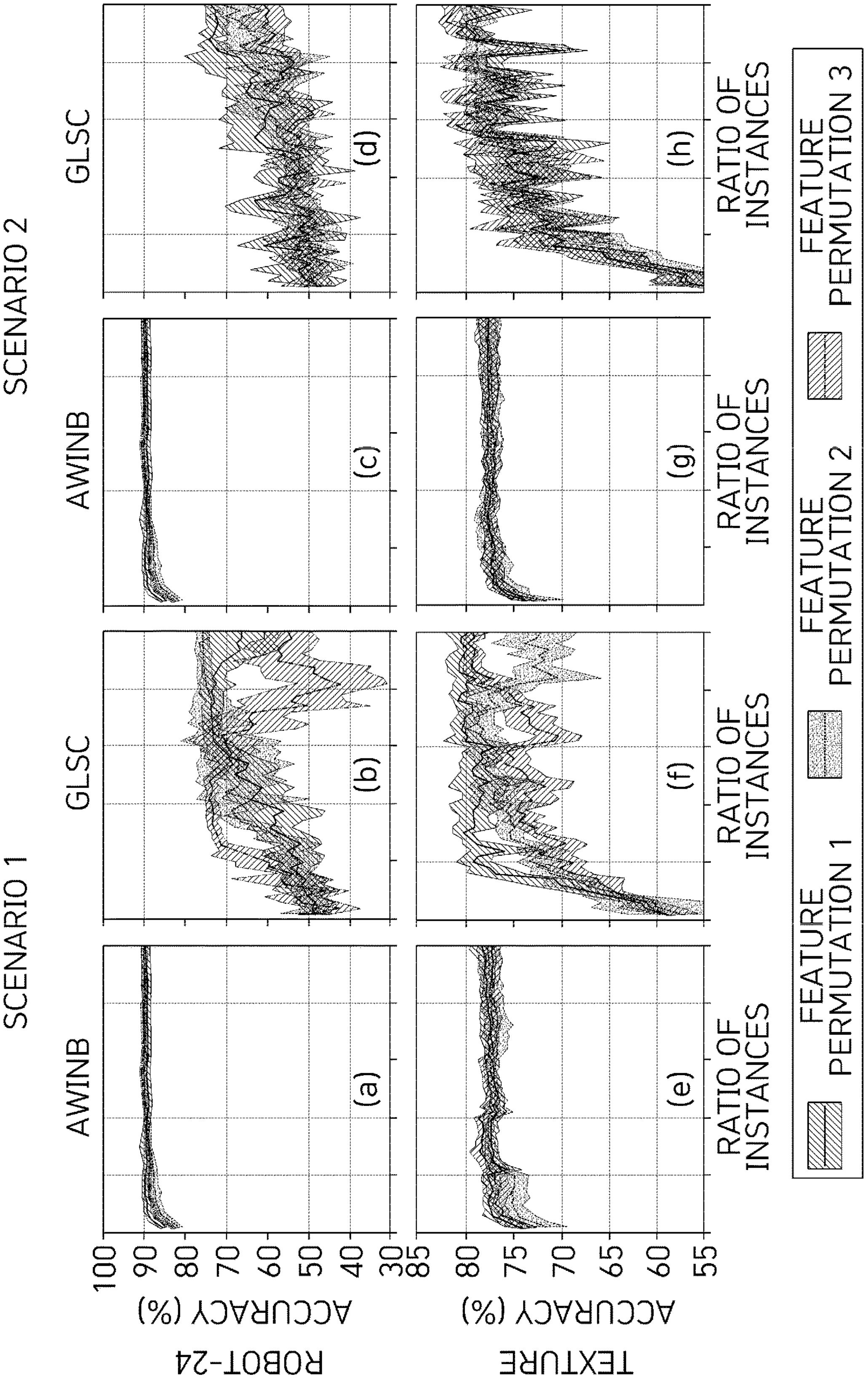
FIG. 2 is a diagram illustrating the performance comparison results between the AWINB model according to the present invention and the existing GLSC model.

In FIG. 2, all graphs have three curves (feature permutation 1, feature permutation 2 and feature permutation 3), which indicate differences in feature permutations. Each curve has a varying width, which indicates the change in the prediction result when an input order of instances randomly varies 5 times in one feature permutation, and the solid line in the middle indicates an average of these values. In FIG. 2, it may be observed that the AWINB draws an incremental learning curve that is robust to the feature permutation and the change in the order of instances, but the GLSC draws an unstable and fairly shaky learning curve. In addition, the GLSC needs to substitute hundreds of hyperparameter values for hyperparameter optimization, but the AWINB is able to obtain optimized results with only 8 hyperparameter adjustments. From the above description, it can be seen that the present invention has distinct advantages over the related art.

Effects which can be achieved by the present invention are not limited to the above-described effects. That is, other objects that are not described may be obviously understood by those skilled in the art to which the present invention pertains from the above detailed description.

Although the configuration of the present invention has been described in detail above with reference to the accompanying drawings, this is merely an example, and those skilled in the art to which the present invention pertains can make various modifications and changes within the scope of the technical spirit of the present invention. Therefore, the protection scope of the present invention should not be limited to the above-described embodiments and should be defined by the description of the following claims.

What is claimed is:

1. A device for incremental machine learning in a technical field in which a feature space has configurations of variables that are continuously varying, comprising:

one or more processors; and a memory storing instructions that, when executed by the one or more processors, cause the one or more processors to:

receive a first dataset from the feature space;

generate, based on the first dataset, a probability table for a target feature of the first dataset and a conditional probability table for each input feature of the first dataset, wherein the probability table and the conditional probability table are data structures stored in the memory;

extract, from the data structures stored in the memory, relevance between the target feature and each of the input features and redundancy between the input features, based on the first dataset;

extract weights for each of the input features based on the relevance and the redundancy, according to the following equation, $$w_i = \sigma(\alpha_i \cdot D(X_i) - \beta_i \cdot R(X_i)) \quad \text{[Equation]}$$

(in the above equation, i denotes an identifier of the input feature, $w_i$ denotes the weight, $D(X_i)$ denotes the relevance of the input feature $X_i$, $\alpha_i$ denotes a coefficient ($\alpha_i \geq 0$) of the relevance, $R(X_i)$ denotes the redundancy of the input feature $X_i$, $\beta_i$ denotes a coefficient ($\beta_i \geq 0$) of redundancy, and $\sigma(x)$ denotes a sigmoid function with 1/(1+e−x));

generate a prediction model comprising a naïve Bayes-based incremental classifier in which each input feature is represented as a feature node connected to a class node representing the target feature, based on the probability table for the target feature, the conditional probability table, and the weights;

receive a second dataset from the feature space;

evaluate an accuracy of the prediction model using the second dataset, and determine $\alpha_i$ and $\beta_i$ of the above equation based on the accuracy, so as to adaptively optimize the weights;

update the prediction model automatically, based on the probability table for the target feature, the conditional probability table, and the optimized weights determined using the determined $\alpha_i$ and $\beta_i$;

receive a third dataset from the feature space;

perform reasoning on the third dataset using the updated prediction model; and output, to an output interface device, reasoning results of the updated prediction model, wherein the feature space and the reasoning results correspond to at least one of:

the feature space being defined by medical information including data from electronic medical records (EMRs) or electronic health records (EHRs), and the reasoning results being provided to a medical information-based decision support system;

the feature space being defined by data collected in an Internet-of-Things (IoT)-based smart factory, and the reasoning results being used in the IoT-based smart factory; or the feature space being defined by financial data, and the reasoning results being provided to a financial data analysis system to perform financial prediction.

2. The device of claim 1, wherein the one or more processors are further caused to extract the relevance based on mutual information between the target feature and each of the input features from the first dataset.

3. The device of claim 1, wherein the one or more processors are further caused to extract the redundancy based on mutual information between the input features from the first dataset.

4. The device of claim 1, wherein the one or more processors are further caused to generate the prediction model after setting the weights to 1.

5. The device of claim 1, wherein the one or more processors are further caused to extract the weights after setting $\alpha_i$ to 1 and $\beta_i$ to 1 in the above equation.

6. The device of claim 1, wherein the one or more processors are further caused to update the probability table for the target feature and the conditional probability table based on a fourth dataset when the fourth dataset is input after the first dataset is input.

7. The device of claim 6, wherein the one or more processors are further caused to update the relevance and the redundancy based on the fourth dataset.

8. The device of claim 6, wherein the one or more processors are further caused to not update the conditional probability table for a missing variable when the missing variable is in the fourth dataset.

9. The device of claim 6, wherein the one or more processors are further caused to calculate a conditional probability for a new feature to update the conditional probability table when there is an input feature ("new feature") that is not reflected in the conditional probability table in the fourth dataset.

10. The device of claim 7, wherein the one or more processors are further caused to not update relevance and redundancy for a missing variable when the missing variable is in the fourth dataset.

11. The device of claim 7, wherein the one or more processors are further caused to update the relevance and the redundancy for all input features having data in the fourth dataset, including a new feature when there is an input feature ("new feature") that is not reflected in the relevance and the redundancy in the fourth dataset.

12. A method of incremental machine learning in a technical field in which a feature space has configurations of variables that are continuously varying, comprising:

receiving a first dataset from the feature space;

generating, based on the first dataset, a probability table for a target feature of the first dataset and a conditional probability table for each input feature of the first dataset;

extracting relevance between the target feature and each of the input features and redundancy between the input features, based on the first dataset;

extracting weights for each of the input features based on the relevance and the redundancy according to the following equation, $$w_i = \sigma(\alpha_i \cdot D(X_i) - \beta_i \cdot R(X_i)) \quad \text{[Equation]}$$

(in the above equation, i denotes an identifier of the input feature, $w_i$ denotes the weight, $D(X_i)$ denotes the relevance of the input feature $X_i$, $\alpha_i$ denotes a coefficient ($\alpha_i \geq 0$) of the relevance, $R(X_i)$ denotes the redundancy of the input feature $X_i$, $\beta_i$ denotes a coefficient ($\beta_i \geq 0$) of redundancy, and $\sigma(x)$ denotes a sigmoid function with $1/(1+e^{-x})$);

generating a prediction model comprising a naïve Bayes-based incremental classifier in which each input feature is represented as a feature node connected to a class node representing the target feature, based on the probability table for the target feature, the conditional probability table, and the weights;

receiving a second dataset from the feature space;

evaluating an accuracy of the prediction model using the second dataset, and determining $\alpha_i$ and $\beta_i$ of the above equation based on the accuracy, so as to adaptively optimize the weights;

updating the prediction model automatically, based on the probability table for the target feature, the conditional probability table, and the optimized weights determined using the determined $\alpha_i$ and $\beta_i$;

receiving a third dataset from the feature space;

performing reasoning on the third dataset using the updated prediction model; and outputting, to an output interface device, reasoning results of the updated prediction model, wherein the feature space and the reasoning results correspond to at least one of:

the feature space being defined by medical information including data from electronic medical records (EMRs) or electronic health records (EHRs), and the reasoning results being provided to a medical information-based decision support system;

the feature space being defined by data collected in an Internet-of-Things (IoT)-based smart factory, and the reasoning results being used in the IoT-based smart factory; or the feature space being defined by financial data, and the reasoning results being provided to a financial data analysis system to perform financial prediction.

13. The method of claim 12, further comprising:

receiving a fourth dataset from the feature space after the first dataset is received;

updating the probability table for the target feature, the conditional probability table, the relevance and the redundancy based on the fourth dataset; and updating the prediction model based on the updated probability table for the target feature, the updated conditional probability table, the updated relevance, and the updated redundancy.

14. The method of claim 13, wherein, in the updating of the prediction model, the conditional probability table is updated by calculating a conditional probability for a new feature when there is an input feature ("new feature") that is not reflected in the conditional probability table in the fourth dataset.

15. The method of claim 13, wherein, in the updating of the prediction model, the relevance and the redundancy for all input features having data in the fourth dataset are updated, including a new feature when there is an input feature ("new feature") that is not reflected in the relevance and the redundancy in the fourth dataset.

* * * * *